US012677251B2

(12) United States Patent
Cheng et al.

(10) Patent No.: US 12,677,251 B2
(45) Date of Patent: Jul. 7, 2026

(54) DELIVERY OF PAGING FOR REMOTE UE VIA RRC SIGNALING

(71) Applicant: QUALCOMM Incorporated, San Diego, CA (US)

(72) Inventors: Peng Cheng, Beijing (CN); Hong Cheng, Basking Ridge, NJ (US); Qing Li, Princeton Junction, NJ (US); Ozcan Ozturk, San Diego, CA (US); Karthika Paladugu, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 18/280,890

(22) PCT Filed: Apr. 27, 2021

(86) PCT No.: PCT/CN2021/090132
§ 371 (c)(1),
(2) Date: Sep. 7, 2023

(87) PCT Pub. No.: WO2022/226759
PCT Pub. Date: Nov. 3, 2022

(65) Prior Publication Data
US 2024/0155557 A1 May 9, 2024

(51) Int. Cl.
*H04W 68/00* (2009.01)
*H04W 8/26* (2009.01)
(Continued)

(52) U.S. Cl.
CPC ........... *H04W 68/005* (2013.01); *H04W 8/26* (2013.01); *H04W 68/02* (2013.01); *H04W 92/18* (2013.01)

(58) Field of Classification Search
CPC ..... H04W 68/005; H04W 8/26; H04W 68/02; H04W 92/18
(Continued)

(56) References Cited

U.S. PATENT DOCUMENTS

2003/0203739 A1* 10/2003 Jung ...................... H04W 68/02
455/458
2010/0074192 A1* 3/2010 Beming .................. H04L 45/72
370/329
(Continued)

FOREIGN PATENT DOCUMENTS

EP          3499975 A1      6/2019
WO     2018082541 A1      5/2018
(Continued)

OTHER PUBLICATIONS

International Search Report and Written Opinion—PCT/CN2021/090132—ISA/EPO Jan. 26, 2022.
(Continued)

*Primary Examiner* — Mark G. Pannell
(74) *Attorney, Agent, or Firm* — Procopio, Cory, Hargreaves & Savitch LLP

(57) ABSTRACT

To facilitate delivery of paging for remote UE, methods, apparatuses, and computer program products are provided. An example method of UE includes receiving, via a sidelink interface from a second UE, paging information. The example method further includes transmitting, to a base station, the paging information. The example method further includes receiving, from the base station, a RRC message comprising a paging record of at least one UE including the second UE. The example method further includes transmitting the paging record to the at least one UE including the second UE via the sidelink interface.

30 Claims, 14 Drawing Sheets

(51) Int. Cl.
   *H04W 68/02*          (2009.01)
   *H04W 92/18*          (2009.01)
(58) Field of Classification Search
   USPC .......................................................... 455/458
   See application file for complete search history.

(56)                    References Cited

U.S. PATENT DOCUMENTS

| | | | | |
|---|---|---|---|---|
| 2018/0069618 | A1* | 3/2018 | Loehr | H04W 72/1263 |
| 2018/0077624 | A1* | 3/2018 | Jung | H04W 36/385 |
| 2018/0176927 | A1* | 6/2018 | Deng | H04W 72/542 |
| 2018/0227156 | A1* | 8/2018 | Papasakellariou | |
| | | | | H04L 27/2613 |
| 2018/0279110 | A1* | 9/2018 | Sen | H04W 8/005 |
| 2019/0141693 | A1* | 5/2019 | Guo | H04L 5/0053 |
| 2019/0261309 | A1* | 8/2019 | Martin | H04W 76/14 |
| 2019/0373578 | A1* | 12/2019 | Hong | H04W 76/28 |
| 2019/0387498 | A1* | 12/2019 | Li | H04W 40/12 |
| 2020/0077253 | A1* | 3/2020 | Kim | H04W 76/30 |
| 2020/0092845 | A1* | 3/2020 | Cai | H04W 68/02 |
| 2020/0187152 | A1* | 6/2020 | Karampatsis | H04W 4/06 |
| 2022/0124475 | A1* | 4/2022 | Kang | H04W 48/14 |
| 2022/0141756 | A1* | 5/2022 | Pan | H04W 48/12 |
| | | | | 370/328 |
| 2023/0026316 | A1* | 1/2023 | Chen | H04W 68/00 |
| 2024/0098815 | A1* | 3/2024 | Freda | H04W 76/14 |
| 2024/0147427 | A1* | 5/2024 | Basu Mallick | H04B 7/15 |

FOREIGN PATENT DOCUMENTS

| | | |
|---|---|---|
| WO | 2018082869 A1 | 5/2018 |
| WO | 2018084788 A1 | 5/2018 |
| WO | 2022011667 A1 | 1/2022 |

OTHER PUBLICATIONS

ZTE: "Summary Report of [AT113bis-e][603][Relay] Proposals from Summary of Agenda Item 8.7.4.1 (ZTE)", 3GPP TSG-RAN WG2 Meeting #113bis electronic, R2-2104405, Online, Apr. 12-Apr. 20, 2021, 76 Pages, Section 2.1.3 and Section 2.4.

OPPO: "TP on Remaining Issues and Down Selection for Paging Relay", 3GPP TSG-RAN2 Meeting #98, R2-1704096_TP on Remaining 15 Issues and down Selection for Paging Relay, 3GPP, Mobile Competence Centre, 650, Route Des Lucioles, F-06921 Sophia-antipolis, vol. RAN WG2, No. Hangzhou, China, May 15, 2017-May 19, 2017, 6 Pages, May 5, 2017, XP051263743, Option 3, p. 5, p. 6, figures 5.1.2.2-3, 4th bullet, p. 6.

Supplementary European Search Report—EP21938247—Search Authority—The Hague—Nov. 20, 2024.

* cited by examiner

702 Receive, via a sidelink interface from a second UE, paging information

704 Transmit, to a base station, the paging information

706 Receive, from the base station, a radio resource control (RRC) message comprising a paging record of at least one UE including the second UE 708 Transmit the paging record to the at least one UE including the second UE via the sidelink interface

700

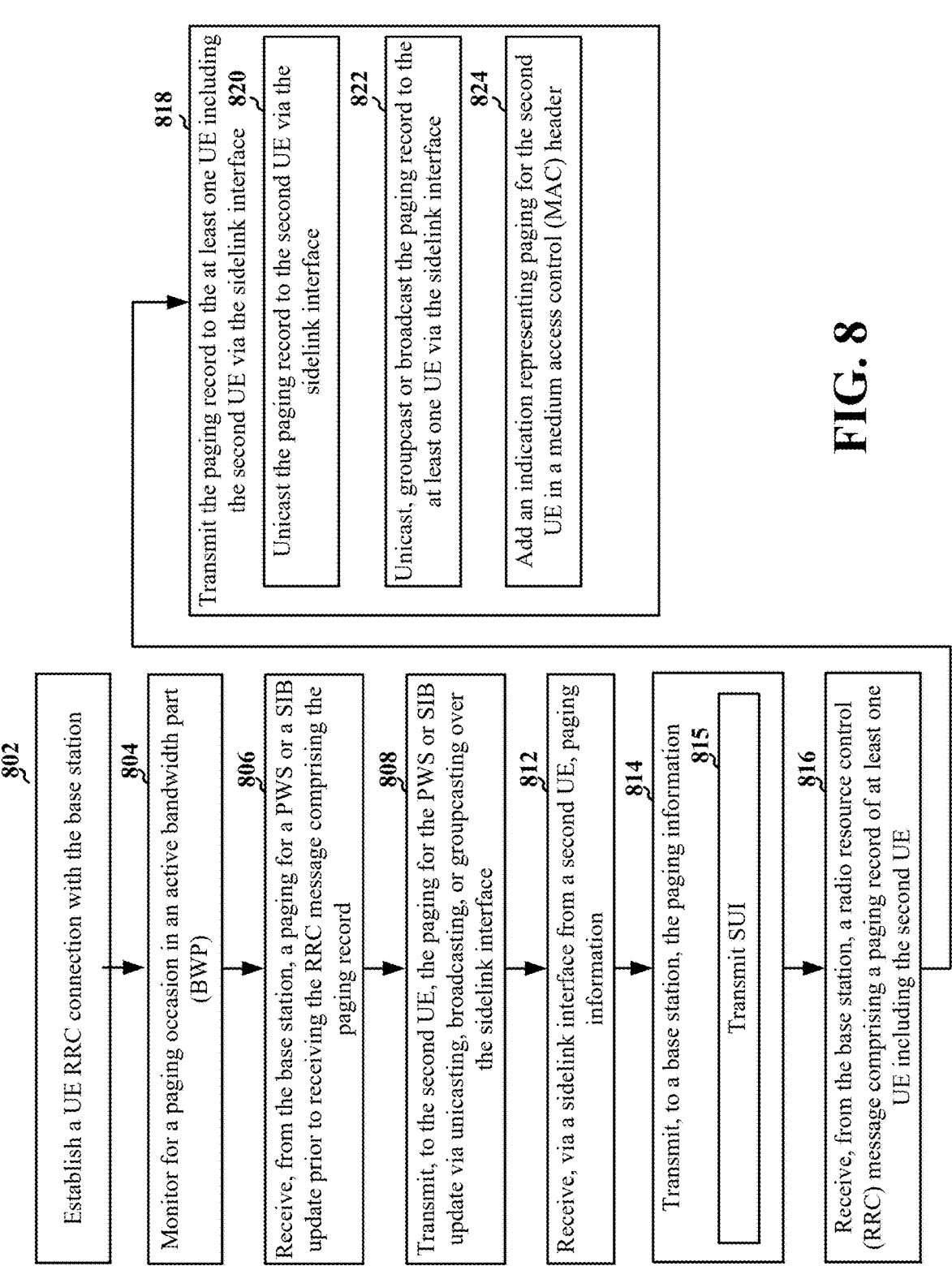

802 Establish a UE RRC connection with the base station

804 Monitor for a paging occasion in an active bandwidth part (BWP)

806 Receive, from the base station, a paging for a PWS or a SIB update prior to receiving the RRC message comprising the paging record 808 Transmit, to the second UE, the paging for the PWS or SIB update via unicasting, broadcasting, or groupcasting over the sidelink interface 812 Receive, via a sidelink interface from a second UE, paging information 814 Transmit, to a base station, the paging information 815 Transmit SUI 816 Receive, from the base station, a radio resource control (RRC) message comprising a paging record of at least one UE including the second UE 818 Transmit the paging record to the at least one UE including the second UE via the sidelink interface 820 Unicast the paging record to the second UE via the sidelink interface 822 Unicast, groupcast or broadcast the paging record to the at least one UE via the sidelink interface 824 Add an indication representing paging for the second UE in a medium access control (MAC) header

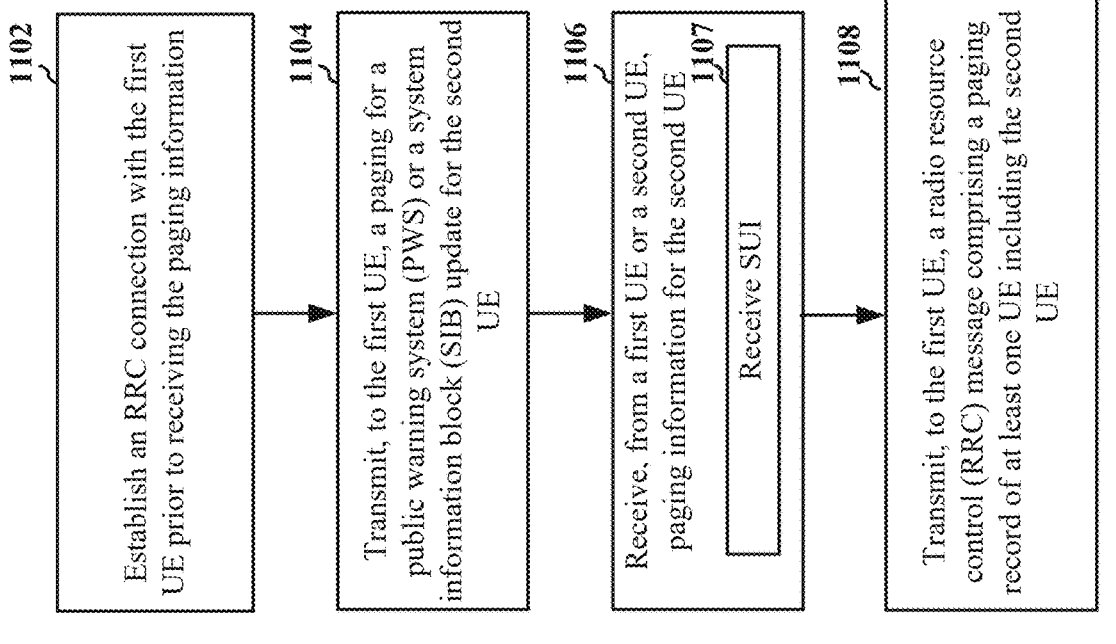

1102

Establish an RRC connection with the first UE prior to receiving the paging information

1104

Transmit, to the first UE, a paging for a public warning system (PWS) or a system information block (SIB) update for the second UE

1106

Receive, from a first UE or a second UE, paging information for the second UE

1107

Receive SUI

1108

Transmit, to the first UE, a radio resource control (RRC) message comprising a paging record of at least one UE including the second UE

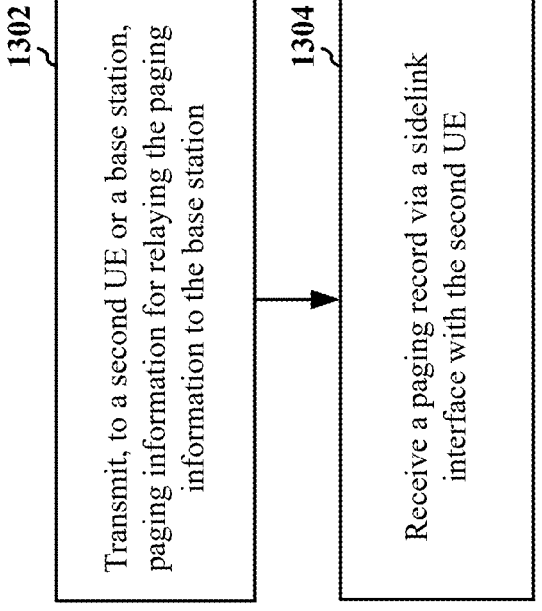
1302
Transmit, to a second UE or a base station, paging information for relaying the paging information to the base station
1304
Receive a paging record via a sidelink interface with the second UE
1300
FIG. 13

DELIVERY OF PAGING FOR REMOTE UE VIA RRC SIGNALING

CROSS REFERENCE TO RELATED APPLICATION(S)

This application is a National Stage Application filed under 35 U.S.C. § 371 of PCT International Application Serial No. PCT/CN2021/090132 entitled "DELIVERY OF PAGING FOR REMOTE UE VIA RRC SIGNALING" and filed on Apr. 27, 2021, which is expressly incorporated by reference herein in its entirety.

TECHNICAL FIELD

The present disclosure relates generally to communication systems, and more particularly, to wireless communication systems with paging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, via a sidelink interface from a second UE, paging information. The memory and the at least one processor coupled to the memory may be further configured to transmit, to a base station, the paging information. The memory and the at least one processor coupled to the memory may be further configured to receive, from the base station, a radio resource control (RRC) message including a paging record of at least one UE including the second UE. The memory and the at least one processor coupled to the memory may be further configured to transmit the paging record to the at least one UE including the second UE via the sidelink interface.

In another aspect of the disclosure, a method, a computer-readable medium, and an apparatus at a base station are provided. The memory and the at least one processor coupled to the memory may be configured to receive, from a first UE or a second UE, paging information for the second UE. The memory and the at least one processor coupled to the memory may be further configured to transmit, to the first UE, a RRC message including a paging record of at least one UE including the second UE.

In another aspect of the disclosure, a method, a computer-readable medium, and an apparatus at a UE are provided. The memory and the at least one processor coupled to the memory may be configured to transmit, to a second UE or a base station, paging information for relaying the paging information to the base station, wherein the paging information comprises one or more UE identifiers (IDs) associated with the UE or one or more paging occasions. The memory and the at least one processor coupled to the memory may be further configured to receive a paging record via a sidelink interface with the second UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

FIG. 11 is a flowchart of a method of wireless communication.

FIG. 13 is a flowchart of a method of wireless communication.

DETAILED DESCRIPTION

Figure 1:
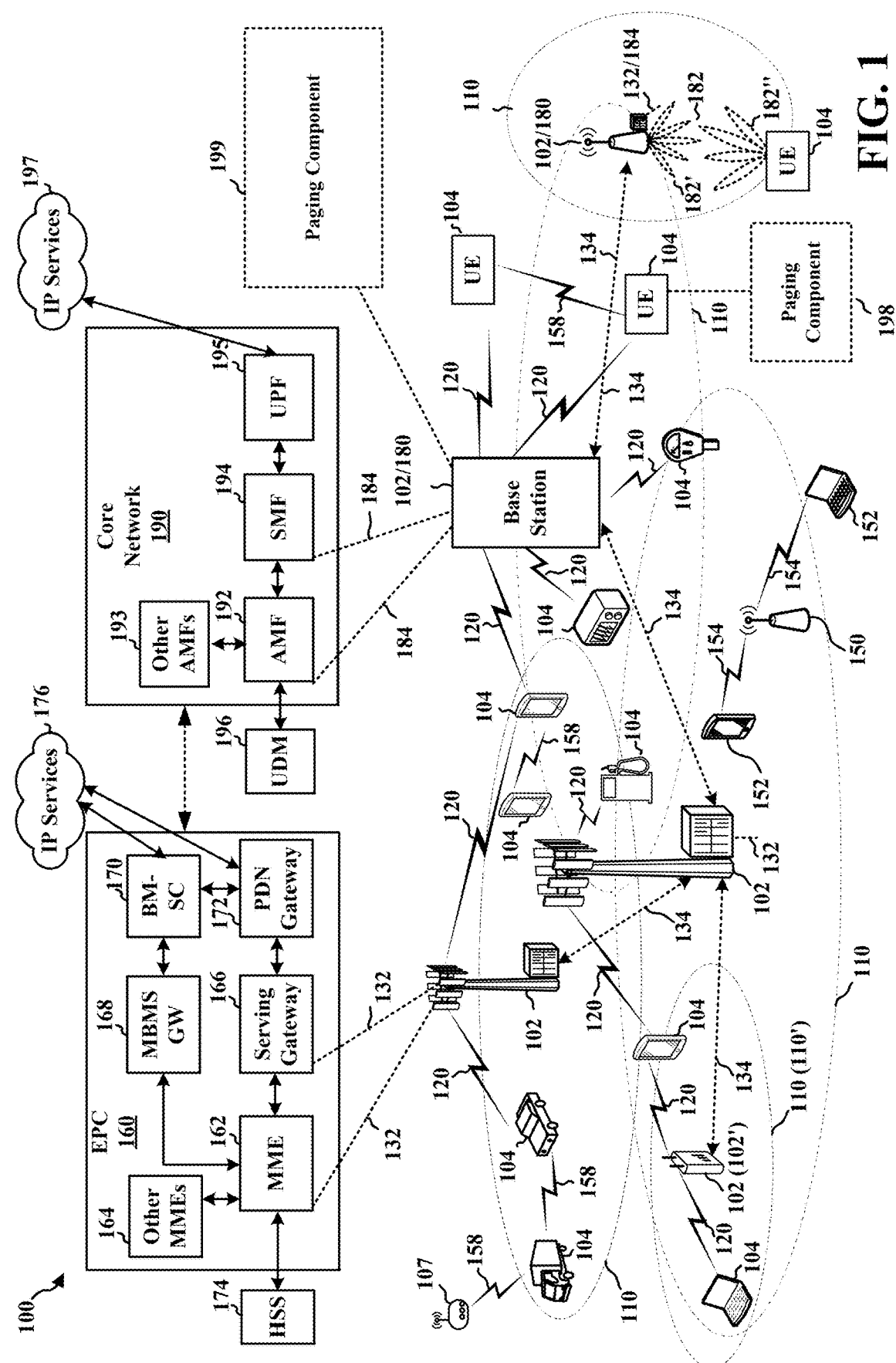
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

A UE in a communication system may enter an idle state when the UE does not have an ongoing data transmission to preserve battery. In the idle state, the UE may monitor for a paging message at a set of defined times. The UE is able to preserve power because the UE may turn off a receiver at the UE when the UE is not monitoring for the paging message. For example, discontinuous reception (DRX) and other similar techniques may be employed by the UE to preserve battery. When a network receives new data for the UE or determines to transmit new data to the UE for a variety of reasons such as public warning system (PWS) or other emergency, the network may transmit the paging message to probe the idle UE so that the UE may receive the new data.

Due to an issue, such as blockage or fading, the communication link between the network and the UE may be degraded, fail, or be dropped. Accordingly, the network may leverage sidelink channels between another UE (which may be referred to as a relay UE) and the UE (which may be referred to as a remote UE) to communicate with the UE. For example, the relay UE may forward one or more messages, such as a paging message, to the remote UE. Aspects provided herein enables delivery of paging for a remote UE via radio resource control (RRC) signaling.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station.

Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may include a paging component 198. The paging component 198 may be configured to receive, via a sidelink interface from a second UE, paging information. The paging component 198 may be further configured to transmit, to a base station, the paging information. The paging component 198 may be further configured to receive, from the base station, a RRC message including a paging record of at least one UE including the second UE. The paging component 198 may be further configured to transmit the paging record to the at least one UE including the second UE via the sidelink interface. In some aspects, the base station 180 may include a paging component 199. The paging component 199 may be configured to receive, from a first UE or a second UE, paging information for the second UE. The paging component 199 may be further configured to transmit, to the first UE, a RRC message including a paging record of at least one UE including the second UE.

Although the following description may be focused on 5G NR, the concepts described herein may be applicable to other similar areas, such as LTE, LTE-A, CDMA, GSM, and other wireless technologies.

Figure 2:
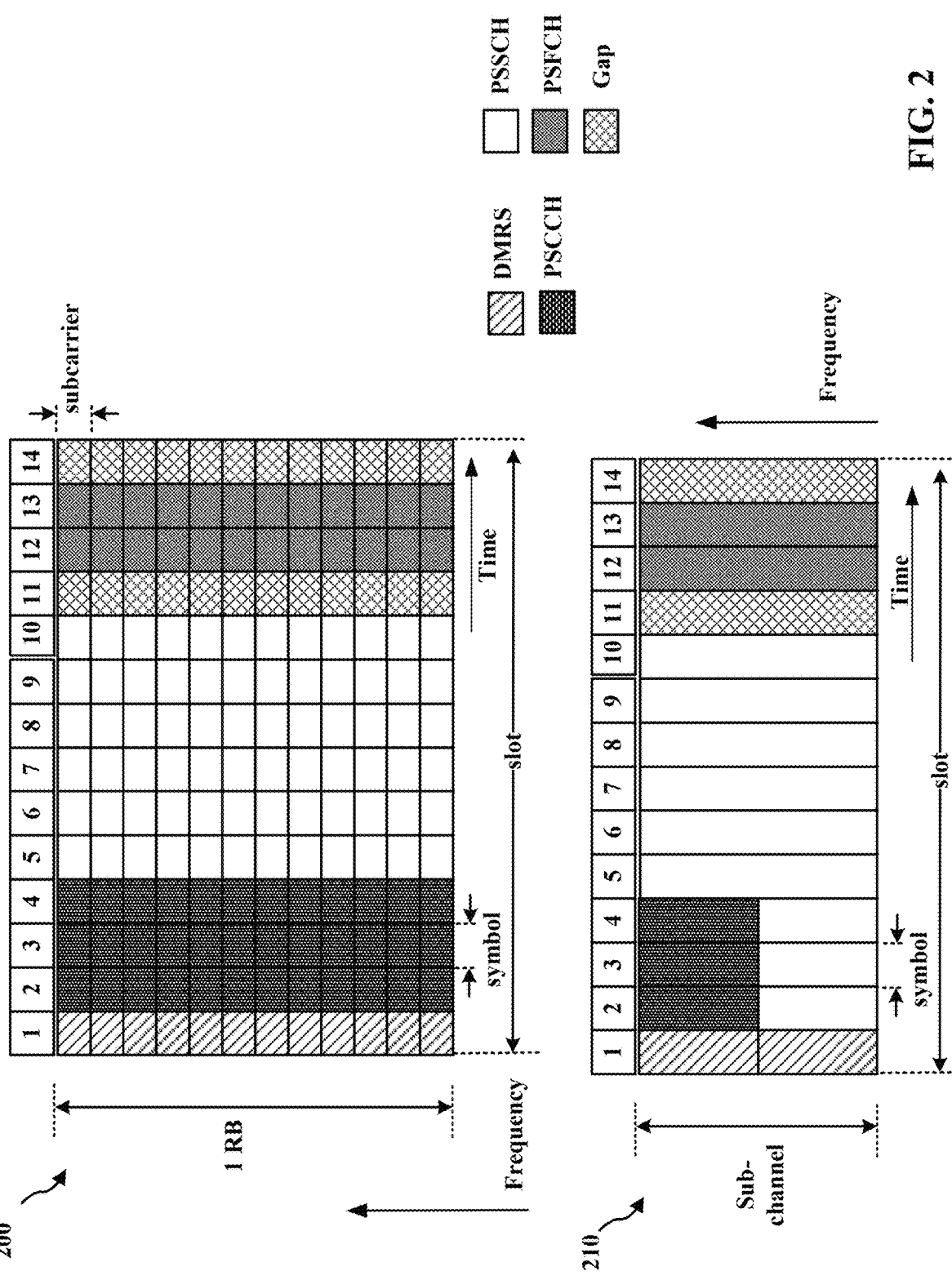
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
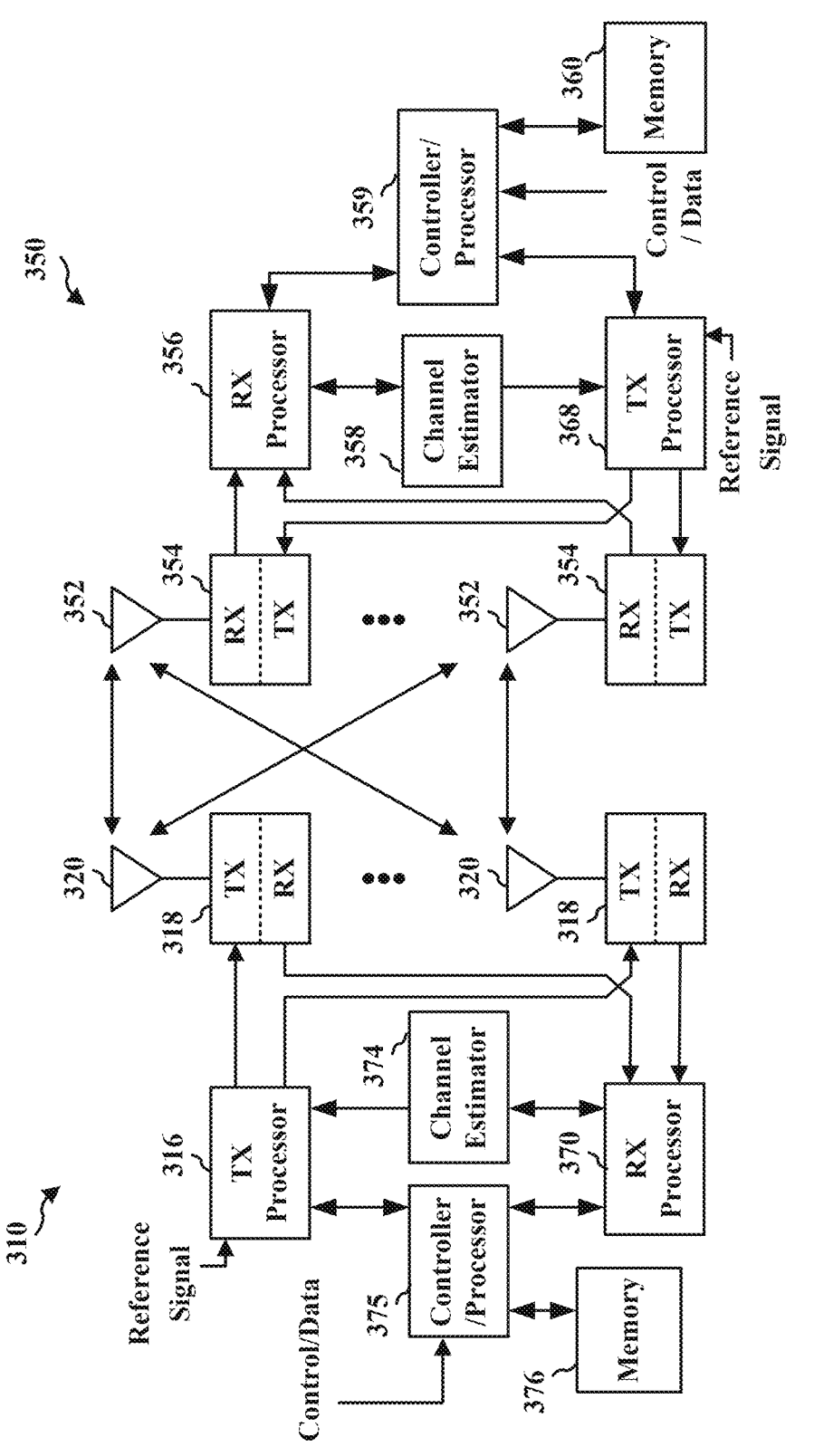
FIG. 3 is a diagram illustrating an example of a base station and user equipment (UE) in an access network.

FIG. 3 is a block diagram of a first wireless communication device 310 in communication with a second wireless communication device 350. The communication may be based on sidelink or an access link. In some examples, the devices 310 and 350 may communicate based on V2X or other D2D communication. In other aspects, the devices 310 and 350 may communication over an access link based on uplink and downlink transmissions. The communication may be based on sidelink using a PC5 interface (e.g., between two UEs). The communication may be based on an access link using a Uu interface (e.g., between a base station and a UE). The devices 310 and the 350 may comprise a UE, an RSU, abase station, etc. In some implementations, the device 310 may correspond to a base station and the device 350 may correspond to a UE. In other implementations, the device 310 may be a UE and the device 350 may be another UE. IP packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BP SK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets, e.g., from an EPC 160. The controller/processor 359 is also responsible for error detection using an ACK and/or NACK protocol to support HARQ operations.

Similar to the functionality described in connection with the transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing to recover IP packets from the device 350. IP packets from the controller/processor 375 may be provided to the EPC 160 in some aspects. The controller/processor 375 is also responsible for error detection using an ACK and/or NACK protocol to support HARQ operations.

At least one of the TX processor 368, the RX processor 356, and the controller/processor 359 may be configured to perform aspects in connection with the paging component 198 of FIG. 1.

At least one of the TX processor 316, the RX processor 370, and the controller/processor 375 may be configured to perform aspects in connection with the paging component 199 of FIG. 1.

A UE in a communication system may enter an idle state when the UE does not have an ongoing data transmission to preserve battery. In the idle state, the UE may monitor for a paging message at a set of defined times. The UE is able to preserve power because the UE may turn off a receiver at the UE when the UE is not monitoring for the paging message. For example, DRX and other similar techniques may be employed by the UE to preserve battery. When a network receives new data for the UE or determines to transmit new data to the UE for a variety of reasons such as PWS or other emergency, the network may transmit a paging message to probe the idle UE so that the UE may receive the new data.

Due to an issue, such as blockage or fading, the communication link between the network and the UE may be degraded, fail, or be dropped. Accordingly, the network may leverage a sidelink channels between another UE (which may be referred to as a relay UE) and the UE (which may be referred to as a remote UE or target UE) to communicate with the remote UE. For example, the relay UE may forward one or more messages, such as a paging message, to the remote UE. Some aspects provided herein may enable delivery of paging for a remote UE via radio resource control (RRC) signaling. Some aspects may enable single-hop, sidelink-based, layer 2 (L2) and layer 3 (L3) based UE-to-Network (U2N) relaying. Some aspects provided herein may provide control plane procedures for U2N, including RRC connection management, system information delivery, paging mechanism and access control for a remote UE. For example, some aspects provided herein may provide paging mechanisms for situations where a relay UE is RRC connected while the remote UE is idle/inactive.

Figure 4:
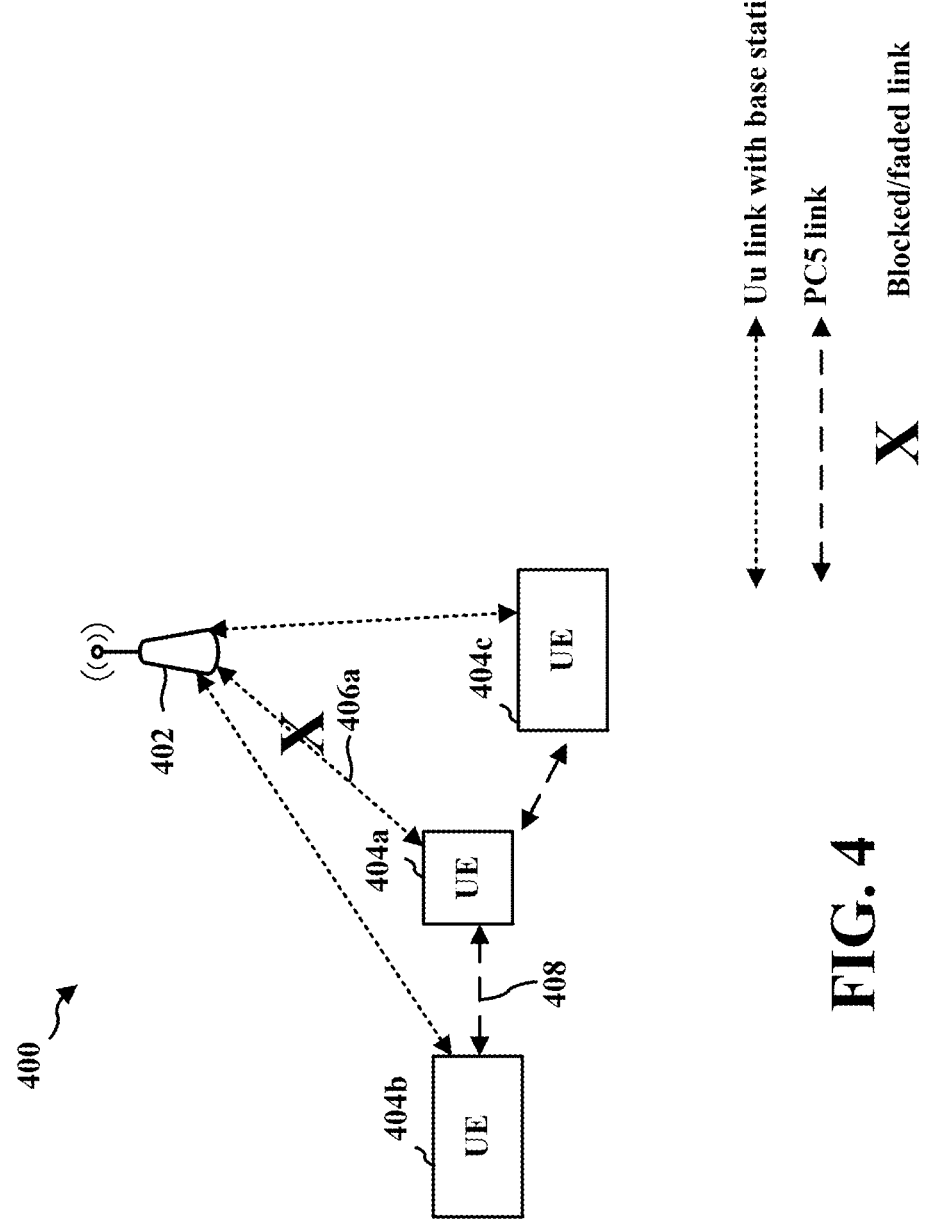
FIG. 4 is a diagram illustrating example sidelink communication.

FIG. 4 is a diagram 400 illustrating example sidelink communication which may include a base station 402 and UEs 404a, 404b, and 404c. Due to an issue, such as blockage or fading, the communication link 406a between the base station 402 and the first (or target) UE 404a may be degraded, fail, or be dropped. Accordingly, the base station 402 may leverage sidelink channels (e.g., a sidelink channel 408) to communicate with the target UE 404a. In the illustrated example of FIG. 4, the base station 402 may determine that the second UE 404b (or other TRP) is in, or near, a helping group of devices that are able to facilitate communication between the base station 402 and the target UE 404a. Accordingly, in FIG. 4, the second UE 404b may help or assist the target UE 404a by forwarding or retransmitting data received from the base station 402 to the target UE 404a through the sidelink 608.

In some examples, to facilitate communication between the base station 402 and the target UE 404a, the base station 402 may transmit communication to one or more UFs 404b and 404c near the target UE 404a for relaying the communication to the target UE 404a over a sidelink.

In a first sidelink resource allocation mode (which may be referred to herein as "Mode 1"), centralized resource allocation may be provided by a network entity. For example, a base station 102 or 180 as in FIG. 1, may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmissions. In order to coordinate the selection of sidelink resources by individual UEs, each UE may use a sensing technique to monitor for resource reservations by other sidelink UEs and may select resources for sidelink transmissions from unreserved resources.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s). In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that include s reservation information based on a resource reservation field comprised in the SCI. The UE may continuously monitor for (e.g., sense) and decode SCI from peer UEs. The SCI may include reservation information, e.g., indicating the slot and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE.

Figure 5:
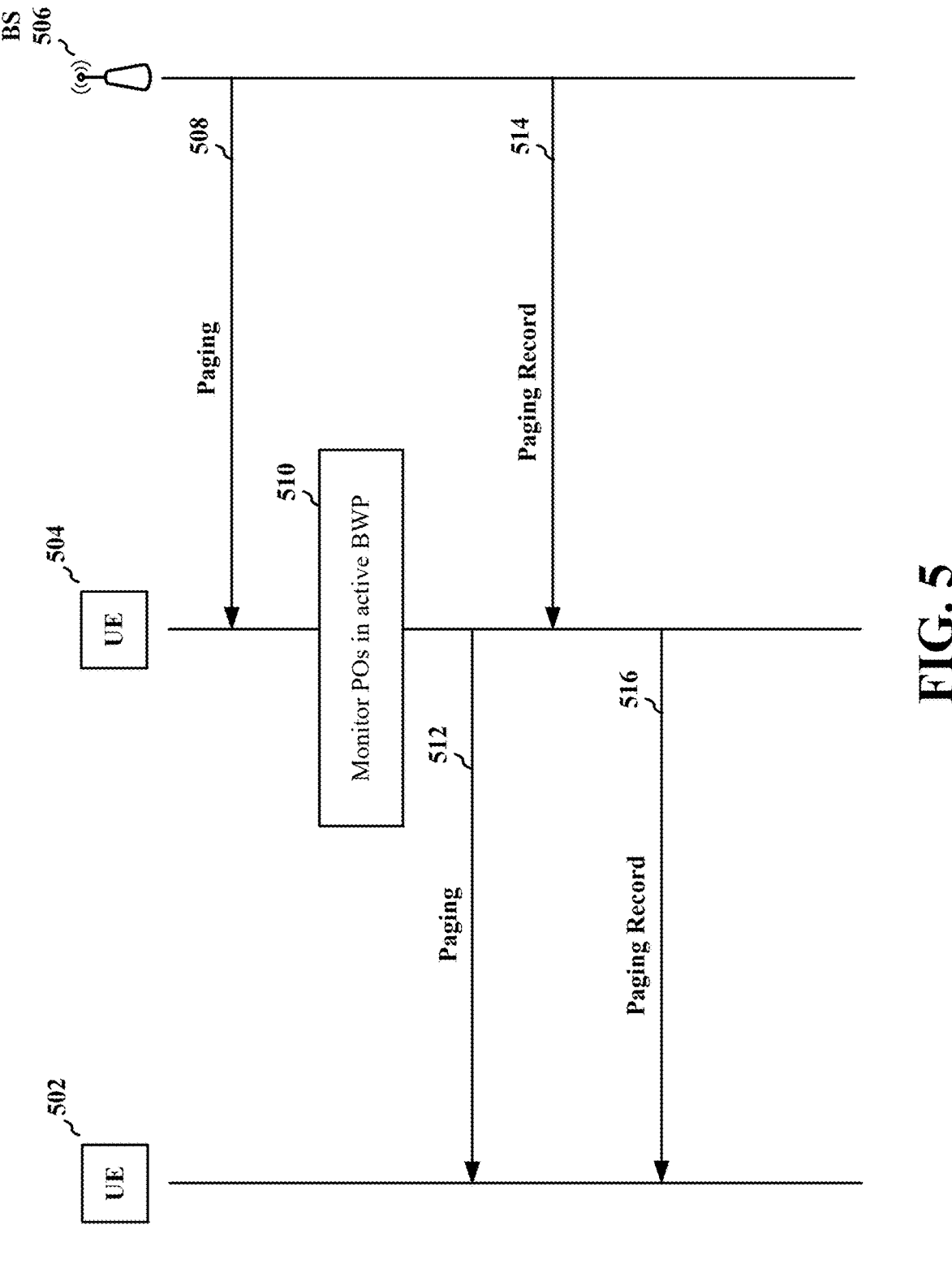
FIG. 5 is a communication flow diagram showing communication exchanged for paging relaying.

FIG. 5 is a communication flow diagram 500 showing communication exchanged for paging relaying. As illustrated in FIG. 5, a UE 502 (which may be referred to as a remote UE), a UE 504 (which may be referred to as a relay UE), and a base station 506 may be included. As illustrated in FIG. 5, the base station 506 may transmit a paging message 508 to the UE 504 that is for reception by the UE 502. In some aspects, the paging message 508 may be associated with a PWS or another type of emergency and may be associated with a system information block (SIB) update. The UE 504 may be configured to monitor one or more paging occasions (POs), such as all POs, in an active bandwidth part (BWP) at 510. Upon receiving the paging message 508, the UE 504 may forward the paging message 508 to the UE 502 in paging message 512. In some aspects, the UE 504 may transmit the paging message 512 to the UE 502 by unicasting the paging message to the UE 502. In some aspects, the UE 504 may transmit the paging message 512 to the UE 502 by groupcasting or broadcasting the paging message to a group of UEs including the UE 502. In some aspects, the UE 504 may transmit the paging message 512 to the UE 502 via a sidelink interface, such as a PC5 interface. For example, the UE 504 may groupcast, broadcast, or unicast a PC5 message that includes the paging message 512 in an initial sidelink BWP and the UE 502 may accordingly receive the PC5 message. The PC5 message may be a dedicated PC5 message for paging. In some aspects, the paging message 508 may be transmitted and received on a Uu interface, such as in a Uu RRC message. In some aspects, the paging message 508 may be transmitted and received on a PC5 interface, such as in a PC5 RRC message.

The base station 506 may transmit a paging record 514 of the UE 502 to the UE 504. For example, the paging record 514 may be downlink (DL) UE information multi-radio access technology dual connectivity (MRDC) which may include paging record of the UE 502 for dedicated data. In some aspects, upon receiving the paging record 514, the UE 504 may transmit the paging record, in paging record 516, to the UE 502. In some aspects, the UE 504 may transmit the paging record 516 via a sidelink interface. For example, the UE 504 may transmit the paging record 516 via a PC5 interface in a PC5 message. The PC5 message may be a dedicated PC5 message for paging.

Figure 6:
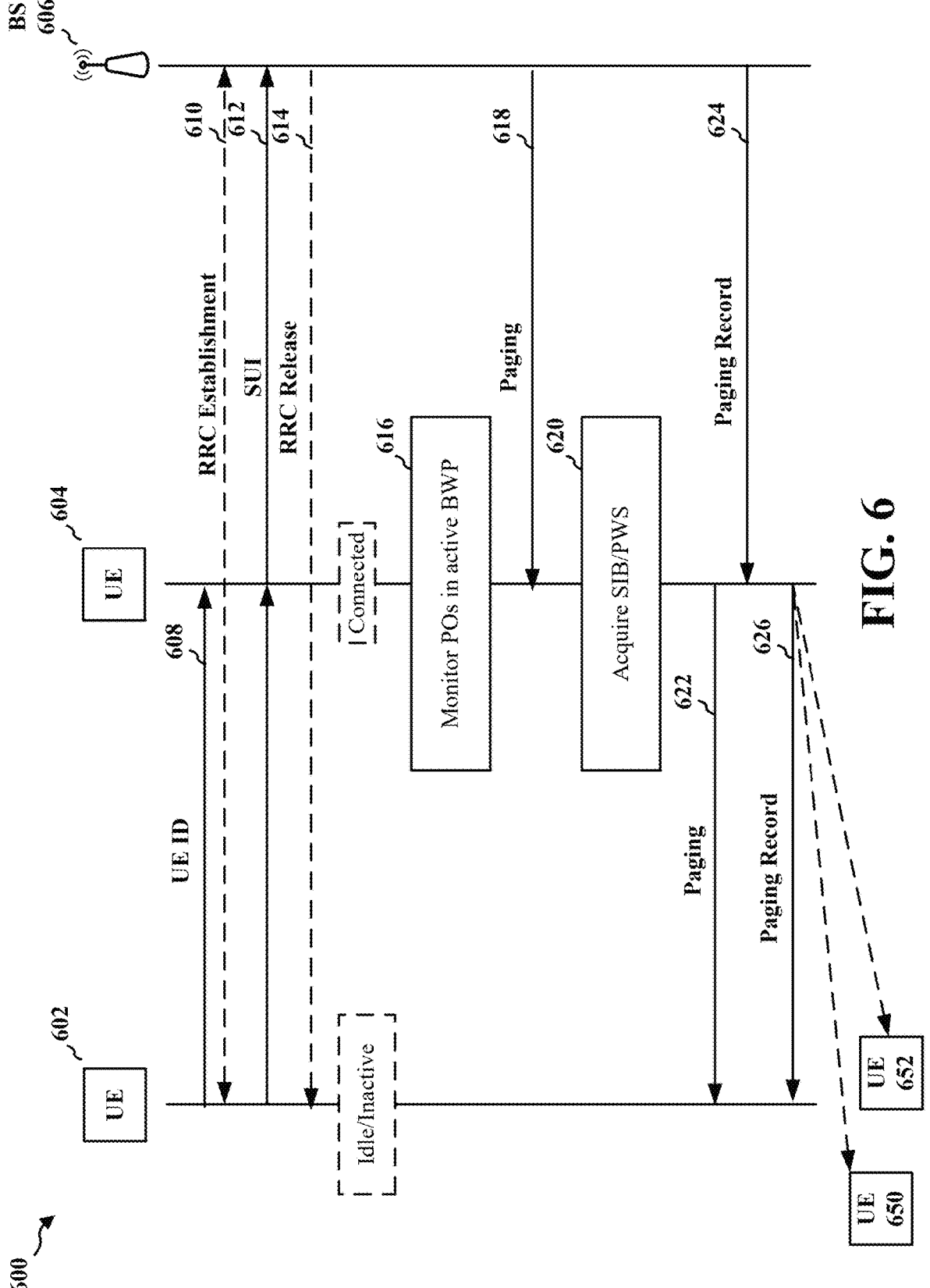
FIG. 6 is a communication flow diagram showing communication exchanged for paging relaying.

FIG. 6 is a communication flow diagram 600 showing communication exchanged for paging relaying. As illustrated in FIG. 6, a UE 602 (which may be referred to as a remote UE), a UE 604 (which may be referred to as a relay UE), and a base station 606 may be included. The UE 602 may transmit to the UE 604 paging information for paging between the network (e.g., the base station 606) and the UE 602. The paging information may include UE identifier(s) (ID(s)) 608. The UE ID (s) 608 may include a serving temporary mobile subscriber (S-TMSI) ID, an inactive radio network temporary identifier (I-RNTI), a pseudo UE ID, or a UE local ID associated with the UE 602. In some aspects, a pseudo UE ID may be a mod, such as mod N (N being an integer such as 1024), of the S-TMSI, the I-RNTI, or the UE local ID. The UE 602 may further transmit one more POs to the UE 604. In some aspects, the UE ID (s) 608 may be transmitted via a sidelink interface, such as a PC5 interface. For example, the UE 602 may transmit the UE ID (s) 608 in a PC5-RRC message.

At 610, the UE 602 or the UE 604 may establish an RRC connection with the base station 606. After the RRC connection is established (i.e., RRC connected to the base station 606), the UE 602 or the UE 604 may transmit paging information to the base station 606. For example, the 606 or the UE 604 may transmit paging information in sidelink UE information (SUI) 612. In some aspects, the SUI 612 may include a UE ID such as a S-TMSI or a I-RNTI associated with the UE 602 and a relay UE ID associated with the UE 604. In some aspects, the SUI 612 may include a pseudo UE ID such as a S-TMSI mod 1024 associated with the UE 602 and a relay UE ID associated with the UE 604. In some aspects, the SUI 612 may include the one or more POs for the UE 602 and a relay UE ID associated with the UE 604. For example, the SUI 612 may include a UE ID such as a S-TMSI or a I-RNTI associated with the UE 602 and a relay UE ID associated with the UE 604 without including a pseudo UE ID or one or more POs. In another example, the SUI 612 may include a pseudo UE ID such as a S-TMSI mod 1024 associated with the UE 602 and a relay UE ID associated with the UE 604 without including a UE ID such as a S-TMSI or a I-RNTI associated with the UE 602 or one or more POs. In another example, the SUI 612 may include one or more POs and a relay UE ID associated with the UE 604 without including a UE ID such as a S-TMSI or a I-RNTI associated with the UE 602 or a pseudo UE ID.

The UE 602 may enter an idle/inactive state. Accordingly, the UE 602 and the base station 606 may perform RRC release 614. The UE 602 may enter an idle/inactive state while the UE 604 may be RRC connected. The UE 604 may be configured to monitor one or more POs in an active BWP at 616. In some aspects, the UE 604 may be configured to monitor any PO in the active BWP. In some aspects, the UE 604 may be configured to monitor each PO in the active BWP. The base station 606 may page the UE 602 by transmitting a paging message 618 to the UE 604 that is directed (e.g., for relay to) the UE 604. In some aspects, the paging message 618 may be associated with a PWS or another type of emergency and may be associated with a SIB update. Upon receiving the paging message 618, the UE 604 may acquire SIB/PWS at 620 and may forward the paging message 618 to the UE 602 in paging message 622. In some aspects, the UE 604 may transmit the paging message 622 to the UE 602 by unicasting the paging message to the UE 602. In some aspects, the UE 604 may transmit the paging message 622 to the UE 602 by groupcasting or broadcasting the paging message to a group of UEs including the UE 602.

In some aspects, the UE 604 may transmit the paging message 622 to the UE 602 via a sidelink interface, such as a PC5 interface. For example, the UE 604 may groupcast, broadcast, or unicast a PC5 message that include the paging message 622 in an initial sidelink BWP and the UE 602 may accordingly receive the PC5 message. The PC5 message may be dedicated PC5 message for paging. In some aspects, the paging message 618 may be transmitted and received on a Uu interface, such as in a Uu RRC message. In some aspects, the paging message 618 may be transmitted and received on a PC5 interface, such as in a PC5 RRC message.

The base station 606 may transmit a paging record 624 of the UE 602 to the UE 604. For example, the paging record 624 may be DL UE information MRDC which may include paging record of the UE 602 for mobile terminating (MT) data. In some aspects, the paging record 624 may be transmitted in a Uu RRC message. In some aspects, the paging record 624 may include paging record for the UE 602 without including a paging record for other UEs. In some aspects, the paging record 624 may include paging record for the UE 602 and one or more paging records for other UEs, such as a UE 650 and a UE 652. In some aspects, the paging record 624 may include paging record for the UE 602 and one or more paging records for other UEs if a pseudo UE ID or one or more paging occasions are included in the SUI 612.

In some aspects, upon receiving the paging record 626, the UE 604 may transmit the paging record, in paging record 626, to the UE 602. In some aspects, the UE 604 may transmit the paging record 626 via a sidelink interface. For example, the UE 604 may transmit the paging record 626 via a PC5 interface in a PC5 message. The PC5 message may be a dedicated PC5 message for paging. In some aspects, the UE 604 may unicast the paging record 626 to the UE 602. For example, if the S-TMSI or the I-RNTI are included in the SUI 612 without including a pseudo ID or one or more paging occasions, the UE 604 may unicast the paging record 626 to the UE 602. In some aspects, the UE 604 may unicast, broadcast, or groupcast the paging record 626 to the UE 602. For example, the UE 604 may unicast, broadcast, or groupcast the paging record 626 to the UE 602 if a pseudo UE ID or one or more paging occasions are included in the SUI 612. The UE 604 may also broadcast or groupcast the paging record 616 to the UE 650 or 652. In some aspects, the unicast, broadcast, or groupcast may be via a sidelink interface, such as a PC5 interface.

In some aspects, the UE 604 may not decode a paging message for the UE 602 or the UE 650 or 652 due to privacy. Therefore, the UE 604 may monitor all DCIs scrambled with the UE 604's C-RNTI while being RRC Connected. So there may be DL PDSCH traffics for the UE 604 indicated by DCI scrambled with its C-RNTI. In some aspects, the UE 604 may add indication in medium access control (MAC) header (e.g., a flag) to indicate paging message 622 or paging record 626 is a paging for remote UE 602 (e.g., by including a local/temporary UE ID for relay), if the DCI indicating the UE 604's dedicated RRC message for the UE 602's paged message is scrambled with UE 604's C-RNTI.

Figure 7:
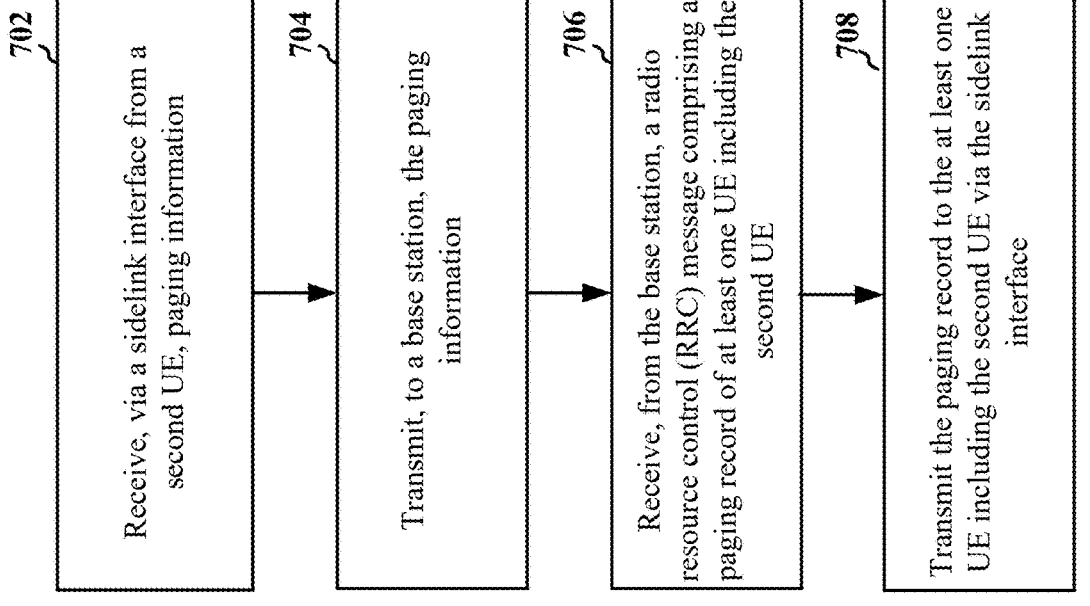
FIG. 7 is a flowchart of a method of wireless communication.

FIG. 7 is a flowchart 700 of a method of wireless communication. The method may be performed by a UE, such as a relay UE (e.g., the UE 104, the UE 404*b*, the UE 404*c*, the UE 504, the UE 604; the apparatus 902).

At 702, the UE may receive, via a sidelink interface from a second UE, paging information. For example, the UE 604 may receive, via a sidelink interface from a second UE 602, paging information including UE ID 608 as described in connection with FIG. 6. In some aspects, 702 may be performed by paging information component 944 in FIG. 9.

At 704, the UE may transmit, to a base station, the paging information. For example, the UE 604 may transmit, to a base station 606, the paging information in SUI 612 as described in connection with FIG. 6. In some aspects, 704 may be performed by paging information component 944 in FIG. 9.

At 706, the UE may receive, from the base station, a RRC message including a paging record of at least one UE including the second UE. For example, the UE 604 may receive, from the base station 606, a RRC message including a paging record 624 of at least one UE including the second UE 602 as described in connection with FIG. 6. In some aspects, 706 may be performed by paging reception component 942 in FIG. 9.

At 708, the UE may transmit the paging record to the at least one UE including the second UE via the sidelink interface. For example, the UE 604 may transmit the paging record 626 to the at least one UE including the second UE 602 via the sidelink interface as described in connection with FIG. 6. In some aspects, 708 may be performed by paging forwarding component 946 in FIG. 9.

FIG. 8 is a flowchart 800 of a method of wireless communication. The method may be performed by a UE, such as a relay UE (e.g., the UE 104, the UE 404*b*, the UE 404*c*, the UE 504, the UE 604; the apparatus 902).

At 802, the UE may establish a UE RRC connection with the base station. For example, the UE 604 may establish a UE RRC connection with the base station 606 prior to transmitting the paging information as described in connection with FIG. 6. In some aspects, 802 may be performed by the reception component 930 and the transmission component 934 in FIG. 9.

At 804, the UE may monitor for a paging occasion in an active BWP. For example, the UE 604 may monitor for a paging occasion in an active BWP at 616 as described in connection with FIG. 6. In some aspects, 804 may be performed by monitoring component 948 in FIG. 9. In some aspects, the UE may monitor one or more DCI scrambled with a C-RNTI in a RRC connected state.

At 806, the UE may receive, from the base station, a paging for a PWS or a SIB update prior to receiving the RRC message including the paging record. For example, the UE 604 may receive, from the base station 606, a paging message 618 for a PWS or a SIB update prior to receiving the RRC message including the paging record 624 as described in connection with FIG. 6.

At 808, the UE may transmit, to the second UE, the paging for the PWS or SIB update via unicasting, broadcasting, or groupcasting over the sidelink interface. For example, the UE 604 may transmit, to the second UE 602, the paging message 622 for the PWS or SIB update via unicasting, broadcasting, or groupcasting over the sidelink interface as described in connection with FIG. 6. In some aspects, the UE may be configured to transmit the paging without decoding a paging message.

At 812, the UE may receive, via a sidelink interface from a second UE, paging information. For example, the UE 604 may receive, via a sidelink interface from a second UE 602, paging information including UE ID 608 as described in connection with FIG. 6. In some aspects, 812 may be performed by paging information component 944 in FIG. 9. In some aspects, the paging information includes one or more UE IDs associated with the second UE or one or more paging occasions. In some aspects, the one or more UE IDs includes: an S-TMSI ID, an I-RNTI, or a pseudo UE ID.

At 814, the UE may transmit, to a base station, the paging information. For example, the UE 604 may transmit, to a base station 606, the paging information in SUI 612 as described in connection with FIG. 6. In some aspects, 814 may be performed by paging information component 944 in FIG. 9. In some aspects, as part of 814, at 815, the UE may transmit, in SUI, the S-TMSI ID or the I-RNTI, and a UE local ID associated with the UE. In some aspects, at 815, the UE may transmit, in SUI, the pseudo UE ID or the one or more paging occasions for the second UE and a local UE ID associated with the UE.

At 816, the UE may receive, from the base station, a RRC message including a paging record of at least one UE including the second UE. For example, the UE 604 may receive, from the base station 606, a RRC message including a paging record 624 of at least one UE including the second UE 602 as described in connection with FIG. 6. In some aspects, 816 may be performed by paging reception component 942 in FIG. 9. In some aspects, the RRC message may include a RRC reconfiguration message or a SUI message. In some aspects, the RRC message may include the paging record in MT data or one or more paging occasions.

At 818, the UE may transmit the paging record to the at least one UE including the second UE via the sidelink interface. For example, the UE 604 may transmit the paging record 626 to the at least one UE including the second UE 602 via the sidelink interface as described in connection with FIG. 6. In some aspects, 818 may be performed by paging forwarding component 946 in FIG. 9. In some aspects, the paging record may include a paging record of the second UE without a paging record of other UEs. In some aspects, such as aspects where the S-TMSI ID or the I-RNTI, and a UE local ID associated with the UE are transmitted in 815, as part of 818, at 820, the UE may unicast the paging record to the second UE via the sidelink interface. In some aspects, the at least one UE may include at least a third UE, such as the UE 650 described in connection with FIG. 6. In some aspects, such as aspects where the pseudo UE ID or the one or more paging occasions for the second UE and a local UE ID associated with the UE are transmitted in 815, as part of 818, at 822, the UE may unicast, groupcast or broadcast the paging record to the at least one UE via the sidelink interface. In some aspects, as part of 818, at 824, the UE may add an indication representing paging for the second UE in a MAC header. In some aspects, the UE may be configured to transmit the paging record without decoding a paging message.

Figure 9:
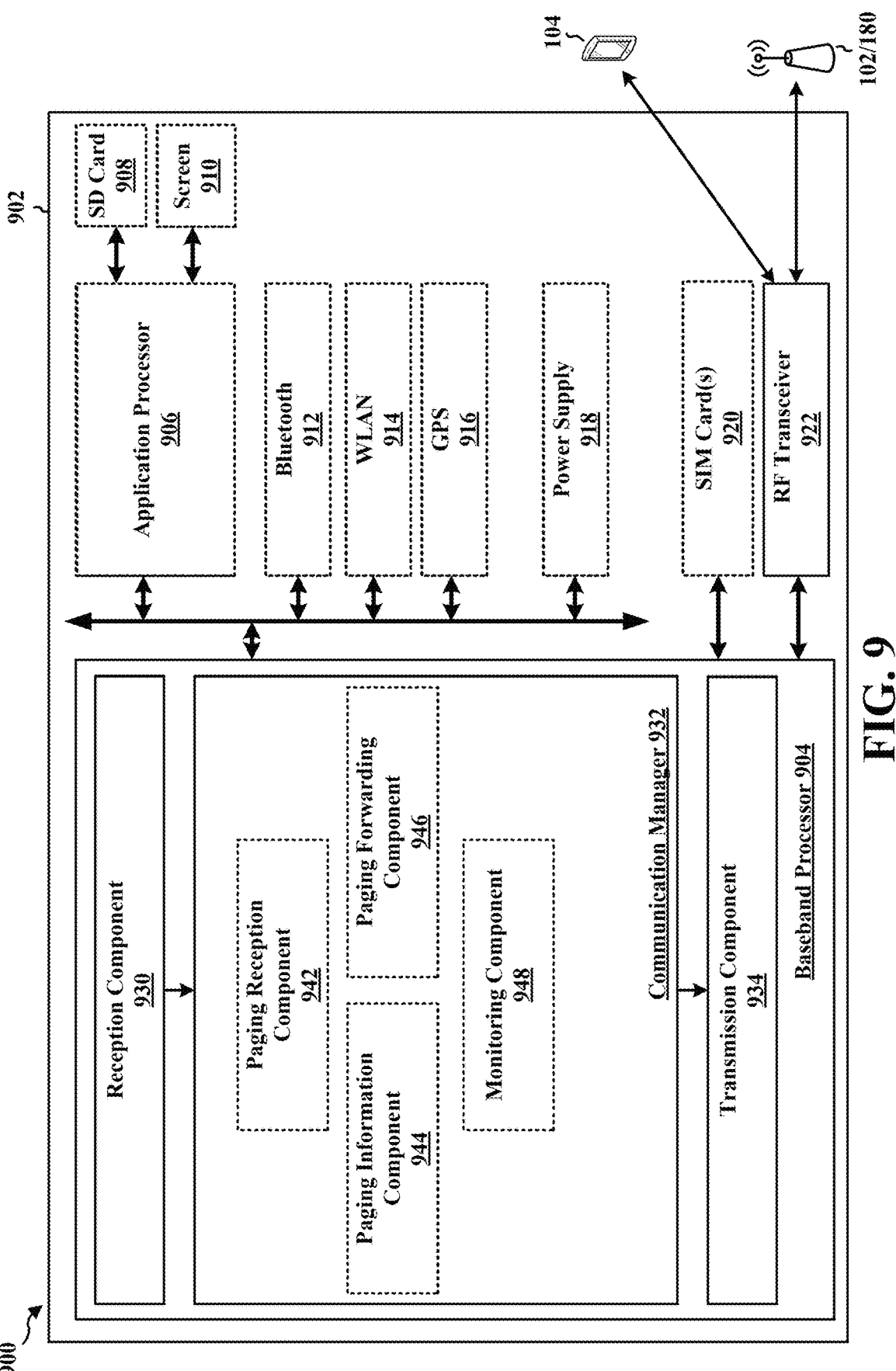
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 902 may include a baseband processor 904 (also referred to as a modem) coupled to an RF transceiver 922. In some aspects, the baseband processor may be a cellular baseband processor, and the RF transceiver may be a cellular RF transceiver. In some aspects, the apparatus 902 may further include one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, or a power supply 918. The baseband processor 904 communicates through the RF transceiver 922 with the UE 104 and/or BS 102/180. The baseband processor 904 may include a computer-readable medium/memory. The computer-readable medium/memory may be non-transitory. The baseband processor 904 is responsible for general processing, including the execution of software stored on the computer-readable medium/memory. The software, when executed by the baseband processor 904, causes the baseband processor 904 to perform the various functions described supra. The computer-readable medium/memory may also be used for storing data that is manipulated by the baseband processor 904 when executing software. The baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband processor 904. The baseband processor 904 may be a component of the device 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the additional modules of the apparatus 902.

The communication manager 932 includes a paging reception component 942 that is configured to receive, from the base station, a paging for a PWS or a SIB update prior to receiving the RRC message comprising the paging record or receive, from the base station, a RRC message comprising a paging record of at least one UE including the second UE, e.g., as described in connection with 706 in FIGS. 7 and 806/816 in FIG. 8. The communication manager 932 further includes a paging information component 944 that may be configured to receive, via a sidelink interface from a second UE, paging information or transmit, to a base station, the paging information, e.g., as described in connection with 702/704 in FIGS. 7 and 802/804 in FIG. 8. The communication manager 932 further includes a paging forwarding component 946 that may be configured to transmit, to the second UE, the paging for the PWS or SIB update via unicasting, broadcasting, or groupcasting over the sidelink interface or transmit the paging record to the at least one UE including the second UE via the sidelink interface, e.g., as described in connection with 708 in FIGS. 7 and 818 in FIG. 8. The communication manager 932 further includes a monitoring component 948 that may be configured to monitor for a paging occasion in an active BWP, e.g., as described in connection with 804 in FIG. 8.

The apparatus may include additional components that perform each of the blocks of the algorithm in the flowcharts of FIGS. 7 and 8. As such, each block in the flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband processor 904, includes means for receiving, via a sidelink interface from a second UE, paging information. The baseband processor 904 may further include means for transmitting, to a base station, the paging information. The baseband processor 904 may further include means for receiving, from the base station, an RRC message comprising a paging record of at least one UE including the second UE. The baseband processor 904 may further include means for transmitting the paging record to the at least one UE including the second UE via the sidelink interface. The baseband processor 904 may further include means for transmitting, in SUI, the S-TMSI ID or the I-RNTI, and a UE local ID associated with the UE. The baseband processor 904 may further include means for unicasting the paging record to the second UE via the sidelink interface. The baseband processor 904 may further include means for transmitting, in SUI, the pseudo UE ID or the one or more paging occasions for the second UE and a local UE ID associated with the UE. The baseband processor 904 may further include means for unicasting, groupcasting or broadcasting the paging record to the at least one UE via the sidelink interface. The baseband processor 904 may further include means for monitoring one or more DCI scrambled with a C-RNTI in an RRC connected state. The baseband processor 904 may further include means for adding an indication representing paging for the second UE in a MAC header. The baseband processor 904 may further include means for establishing a UE RRC connection with the base station prior to transmitting the paging information. The baseband processor 904 may further include means for monitoring for a paging occasion in an active. The baseband processor 904 may further include means for receiving, from the base station, a paging for a PWS or a SIB update prior to receiving the RRC message comprising the paging record. The baseband processor 904 may further include means for transmitting, to the second UE, the paging for the PWS or SIB update via unicasting, broadcasting, or groupcasting over the sidelink interface. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 10:
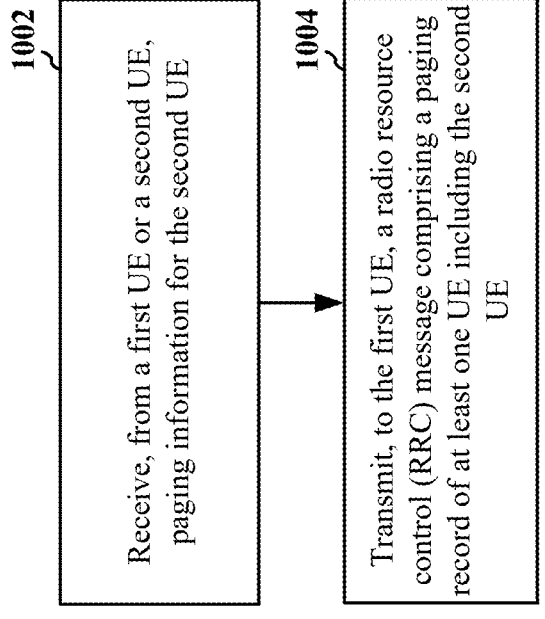
FIG. 10 is a flowchart of a method of wireless communication.

FIG. 10 is a flowchart 1000 of a method of wireless communication. The method may be performed by a base station (e.g., the base station 102, the base station 402, the base station 506, the base station 606; the apparatus 1202).

At 1002, the base station may receive, from a first UE or a second UE, paging information for a second UE. For example, the base station 606 may receive, from a first UE 604 or a second UE 602, paging information for the second UE 602 as described in connection with FIG. 6. In some aspects, 1002 may be performed by the paging component 1244 in FIG. 12.

At 1004, the base station may transmit, to the first UE, a RRC message including a paging record of at least one UE including the second UE. For example, the base station 606 may transmit, to the first UE 604, a RRC message including a paging record 624 of at least one UE including the second UE 602 as described in connection with FIG. 6. In some aspects, 1004 may be performed by the paging component 1244 in FIG. 12.

FIG. 11 is a flowchart 1100 of a method of wireless communication. The method may be performed by a base station (e.g., the base station 102, the base station 402, the base station 506, the base station 606; the apparatus 1202).

At 1102, the base station may establish an RRC connection with the second UE prior to receiving the paging information. For example, the base station 606 may establish an RRC connection with the second UE 604 prior to receiving the paging information in SUI 612 as described in connection with FIG. 6. In some aspects, 1102 may be performed by RRC component 1242 in FIG. 12.

At 1104, the base station may transmit, to the first UE, a paging for a PWS or a SIB update for the second UE. For example, the base station 606 may transmit, to the first UE 604, a paging message 618 for a PWS or a SIB update for the second UE 602 as described in connection with FIG. 6. In some aspects, 1104 may be performed by the paging component 1244 in FIG. 12.

At 1106, the base station may receive, from a first UE or a second UE, paging information for a second UE. For example, the base station 606 may receive, from a first UE 604 or a second UE 602, paging information for the second UE 602 as described in connection with FIG. 6. In some aspects, 1106 may be performed by the paging component 1244 in FIG. 12. In some aspects, the paging information may include one or more UE IDs associated with the second UE or one or more paging occasions. In some aspects, the one or more UE IDs may include: an S-TMSI ID, an I-RNTI, or a pseudo UE ID. In some aspects, as part of 1106, at 1107, the base station may receive SUI. For example, the base station may receive, in SUI, the S-TMSI ID or the I-RNTI, and a UE ID associated with the UE. In some aspects, the base station may receive, in SUI, the pseudo UE ID or the one or more paging occasions for the second UE and a UE ID associated with the UE.

At 1108, the base station may transmit, to the first UE, a RRC message including a paging record of at least one UE including the second UE. For example, the base station 606 may transmit, to the first UE 604, a RRC message including a paging record 624 of at least one UE including the second UE 602 as described in connection with FIG. 6. In some aspects, 1108 may be performed by the paging component 1244 in FIG. 12. In some aspects, the paging record may include a paging record of the second UE without a paging record of other UEs. In some aspects, the at least one UE may include at least a third UE such as the UE 650. In some aspects, the RRC message may include the paging record in MT data or one or more paging occasions.

Figure 12:
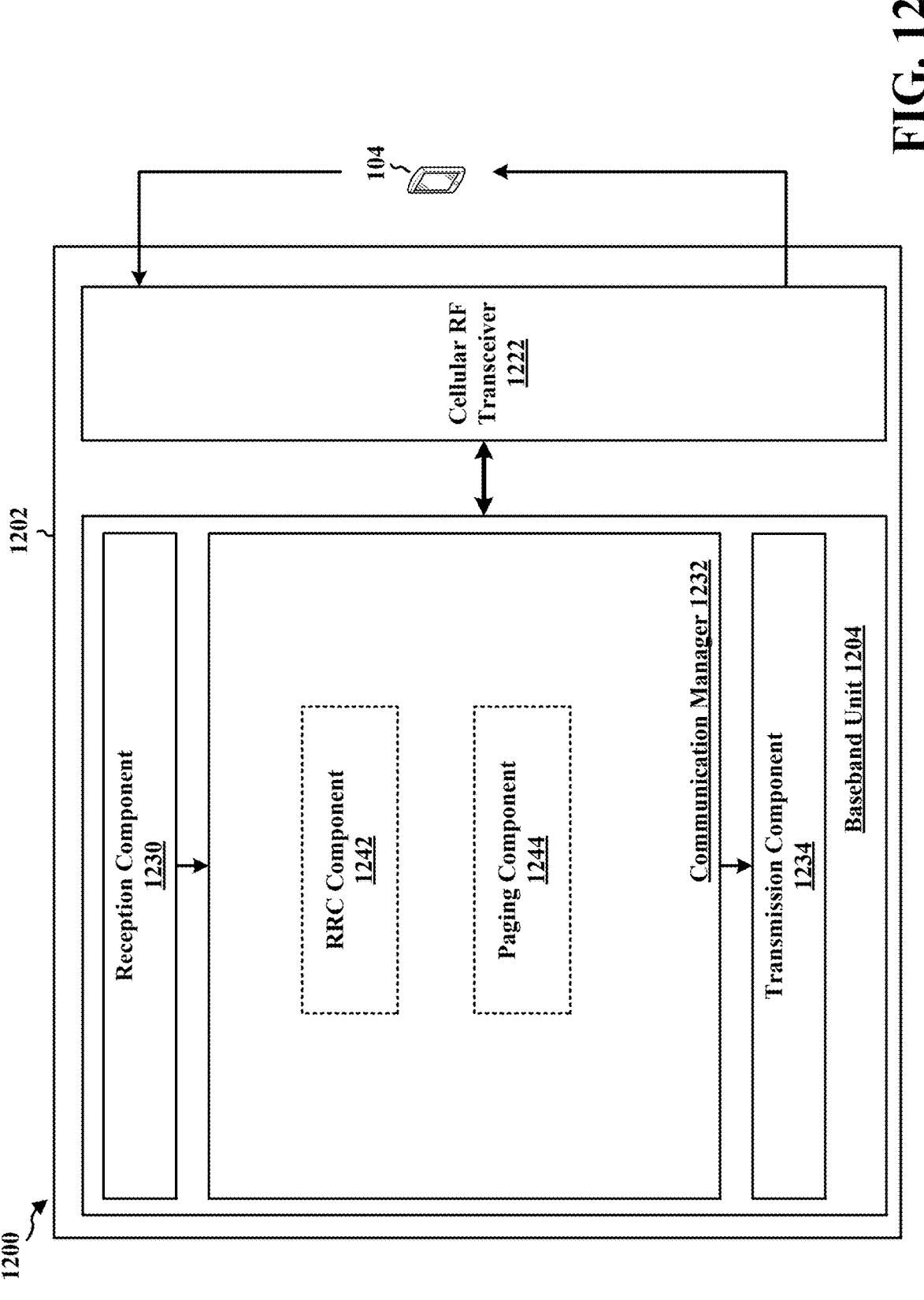
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 902 may include a baseband unit 1204. The baseband unit 1204 may communicate through a cellular RF transceiver 1222 with the UE 104. The baseband unit 1204 may include a computer-readable medium/ memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the device 310 and may include the memory 376 and/or at least one of the TX processor 316, the RX processor 370, and the controller/processor 375.

The communication manager 1232 includes a RRC component 1242 that may establish an RRC connection with the first UE prior to receiving the paging information or transmit, to the first UE, a RRC message comprising a paging record of at least one UE including the second UE e.g., as described in connection with 1004 in FIGS. 10 and 1102/ 1108 in FIG. 11. The communication manager 1232 further includes a paging component 1244 that may receive, from a first UE or a second UE, paging information for the second UE or transmit, to the first UE, a paging for a PWS or a SIB update for the second UE, e.g., as described in connection with 1002 in FIGS. 10 and 1104/1106 in FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, includes means for receiving, from a first UE or a second UE, paging information for a second UE. The baseband unit 1204 may further include means for transmitting, to the first UE, a RRC message comprising a paging record of at least one UE including the second UE. The baseband unit 1204 may further include means for establishing an RRC connection with the first UE prior to receiving the paging information. The baseband unit 1204 may further include means for transmitting, to the first UE, a paging for a PWS or a SIB update for the second UE. The baseband unit 1204 may further include means for receiving, in SUI, the S-TMSI ID or the I-RNTI, and a UE ID associated with the UE. The baseband unit 1204 may further include means for receiving, in SUI, the pseudo UE ID or the one or more paging occasions for the second UE and a UE ID associated with the UE. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/ processor 375 configured to perform the functions recited by the means.

FIG. 13 is a flowchart 1300 of a method of wireless communication. The method may be performed by a UE, such as a remote UE (e.g., the UE 104, the UE 404*a*, the UE 502, the UE 602; the apparatus 1402).

At 1302, the UE may transmit, to a second UE or a base station, paging information for relaying the paging information to the base station. For example, the UE 602 may transmit, to a second UE 604 or a base station 606, paging information such as UE ID 608 for relaying the paging information to the base station as described in connection with FIG. 6. In some aspects, 1302 may be performed by the paging information component 1442 in FIG. 14. In some aspects, the UE may transmit, in SUI, the S-TMSI ID or the I-RNTI, and a UE local ID associated with the UE.

At 1304, the UE may receive a paging record via a sidelink interface with the second UE. For example, the UE 602 may receive a paging record 626 via a sidelink interface with the second UE 604 as described in connection with FIG. 6. In some aspects, 1304 may be performed by paging record component 1444 in FIG. 14.

Figure 14:
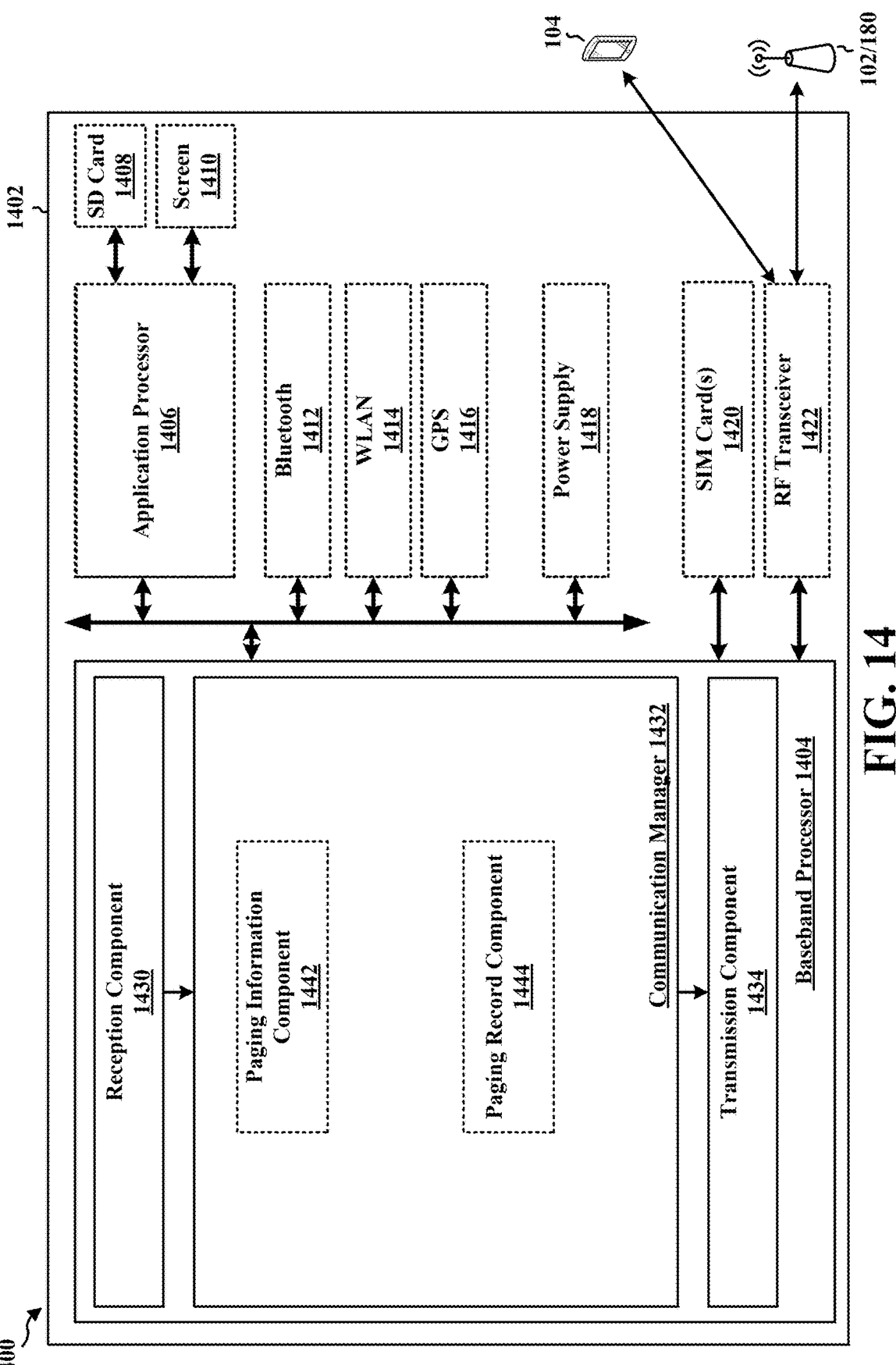
FIG. 14 is a diagram illustrating an example of a hardware implementation for an example apparatus.

FIG. 14 is a diagram 1400 illustrating an example of a hardware implementation for an apparatus 1402. The apparatus 1402 may be a UE, a component of a UE, or may implement UE functionality. In some aspects, the apparatus 1402 may include a baseband processor 1404 (also referred to as a modem) coupled to a RF transceiver 1422. In some aspects, the baseband processor may be a cellular baseband processor, and the RF transceiver may be a cellular RF transceiver. In some aspects, the apparatus 1402 may further include one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, or a power supply 1418. The baseband processor 1404 communicates through the RF transceiver 1422 with the UE 104 and/or BS 102/180. The baseband processor 1404 may include a computer-readable medium/memory. The computer-readable medium/memory may be non-transitory. The baseband processor 1404 is responsible for general processing, including the execution of software stored on the computer-readable medium/memory. The software, when executed by the baseband processor 1404, causes the baseband processor 1404 to perform the various functions described supra. The computer-readable medium/memory may also be used for storing data that is manipulated by the baseband processor 1404 when executing software. The baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband processor 1404. The baseband processor 1404 may be a component of the device 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the additional modules of the apparatus 1402.

The communication manager 1432 includes a paging information component 1442 that is configured to transmit, to a second UE or a base station, paging information for relaying the paging information to the base station, wherein the paging information comprises one or more UE IDs associated with the UE or one or more paging occasions, e.g., as described in connection with 1302 in FIG. 13. The communication manager 1432 further includes a paging record component 1444 that may be configured to receive a paging record via a sidelink interface with the second UE, e.g., as described in connection with 1304 in FIG. 14.

The apparatus may include additional components that perform each of the blocks of the algorithm in the flowchart of FIG. 13. As such, each block in the flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband processor 1404, includes means for transmitting, to a second UE or a base station, paging information for relaying the paging information to the base station, wherein the paging information comprises one or more UE IDs associated with the UE or one or more paging occasions. The baseband processor 1404 may further include means for receiving a paging record via a sidelink interface with the second UE. The means may be one or more of the components of the apparatus 1402 configured to perform the functions recited by the means. As described supra, the apparatus 1402 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, via a sidelink interface from a second UE, paging information; transmit, to a base station, the paging information; receive, from the base station, a RRC message comprising a paging record of at least one UE including the second UE; and transmit the paging record to the at least one UE including the second UE via the sidelink interface.

Aspect 2 is the apparatus of aspect 1, wherein the paging information comprises one or more UE IDs associated with the second UE or one or more paging occasions.

Aspect 3 is the apparatus of any of aspects 1-2, wherein the one or more UE IDs comprises: a S-TMSI ID, an I-RNTI, or a pseudo UE ID.

Aspect 4 is the apparatus of any of aspects 1-3, wherein to transmit the paging information to the base station, the at least one processor coupled to the memory is further configured to: transmit, in SUI, the S-TMSI ID or the I-RNTI, and a UE local ID associated with the UE.

Aspect 5 is the apparatus of any of aspects 1-4, wherein the paging record comprises a paging record of the second UE without a paging record of other UEs.

Aspect 6 is the apparatus of any of aspects 1-5, wherein to transmit the paging record to the at least one UE including the second UE via the sidelink interface, the at least one processor coupled to the memory is further configured to: unicast the paging record to the second UE via the sidelink interface.

Aspect 7 is the apparatus of any of aspects 1-6, wherein to transmit the paging information to the base station, the at least one processor coupled to the memory is further configured to: transmit, in SUI, the pseudo UE ID or the one or more paging occasions for the second UE and a local UE ID associated with the UE.

Aspect 8 is the apparatus of any of aspects 1-7, wherein the at least one UE comprises at least a third UE.

Aspect 9 is the apparatus of any of aspects 1-8, wherein to transmit the paging record to the at least one UE including the second UE via the sidelink interface, the at least one processor coupled to the memory is further configured to: unicast, groupcast or broadcast the paging record to the at least one UE via the sidelink interface.

Aspect 10 is the apparatus of any of aspects 1-9, wherein the RRC message includes the paging record in MT data or one or more paging occasions.

Aspect 11 is the apparatus of any of aspects 1-10, wherein the at least one processor coupled to the memory is further configured to: monitor one or more DCI scrambled with a C-RNTI in a RRC connected state.

Aspect 12 is the apparatus of any of aspects 1-11, wherein to transmit the paging record to the at least one UE including the second UE via the sidelink interface, the at least one processor coupled to the memory is further configured to: add an indication representing paging for the second UE in a MAC header.

Aspect 13 is the apparatus of any of aspects 1-12, wherein the at least one processor coupled to the memory is further configured to transmit the paging record without decoding a paging message.

Aspect 14 is the apparatus of any of aspects 1-13, further comprising a transceiver coupled to the at least one processor.

Aspect 15 is the apparatus of any of aspects 1-14, wherein the at least one processor coupled to the memory is further configured to: establish a UE RRC connection with the base station prior to transmitting the paging information.

Aspect 16 is the apparatus of any of aspects 1-15, wherein the at least one processor coupled to the memory is further configured to: monitor for a paging occasion in an active BWP; receive, from the base station, a paging for a PWS or a SIB update prior to receiving a RRC message comprising the paging record; and transmit, to the second UE, the paging for the PWS or SIB update via unicasting, broadcasting, or groupcasting over the sidelink interface.

Aspect 17 is the apparatus of any of aspects 1-16, wherein the RRC message comprises an RRC reconfiguration message or a SUI message.

Aspect 18 is an apparatus for wireless communication at a base station, comprising: a memory; and at least one processor coupled to the memory and configured to: receive, from a first UE or a second UE, paging information for the second UE; and transmit, to the first UE, a RRC message comprising a paging record of at least one UE including the second UE.

Aspect 19 is the apparatus of aspects 18, wherein the at least one processor coupled to the memory is further configured to: establish an RRC connection with the second UE prior to receiving the paging information.

Aspect 20 is the apparatus of any of aspects 18-19, wherein the at least one processor coupled to the memory is further configured to: transmit, to the first UE, a paging for a PWS or a SIB update for the second UE.

Aspect 21 is the apparatus of any of aspects 18-20, wherein the paging information comprises one or more UE IDs associated with the second UE or one or more paging occasions.

Aspect 22 is the apparatus of any of aspects 18-21, wherein the one or more UE IDs comprises: a S-TMSI ID, an I-RNTI, or a pseudo UE ID.

Aspect 23 is the apparatus of any of aspects 18-22, wherein to receive the paging information from the first UE, the at least one processor coupled to the memory is further configured to: receive, in SUI, the S-TMSI ID or the I-RNTI, and a UE ID associated with the UE.

Aspect 24 is the apparatus of any of aspects 18-23, wherein the paging record comprises a paging record of the second UE without a paging record of other UEs.

Aspect 25 is the apparatus of any of aspects 18-24, wherein to receive the paging information from the first UE, the at least one processor coupled to the memory is further configured to: receive, in SUI, the pseudo UE ID or the one or more paging occasions for the second UE and a UE ID associated with the UE.

Aspect 26 is the apparatus of any of aspects 18-25, wherein the at least one UE comprises at least a third UE.

Aspect 27 is the apparatus of any of aspects 18-26, wherein the RRC message include s the paging record in MT data or one or more paging occasions.

Aspect 28 is the apparatus of any of aspects 18-27, further comprising a transceiver coupled to the at least one processor.

Aspect 29 is an apparatus for wireless communication at a UE, comprising: a memory; and at least one processor coupled to the memory and configured to: transmit, to a second UE or a base station, paging information for relaying the paging information to the base station, wherein the paging information comprises one or more UE IDs associated with the UE or one or more paging occasions; and receive a paging record via a sidelink interface with the second UE.

Aspect 30 is the apparatus of aspect 29, further comprising a transceiver coupled to the at least one processor.

Aspect 31 is a method of wireless communication for implementing any of aspects 1 to 17.

Aspect 32 is an apparatus for wireless communication including means for implementing any of aspects 1 to 17.

Aspect 33 is a computer-readable medium storing computer executable code, where the code when executed by a processor causes the processor to implement any of aspects 1 to 17.

Aspect 34 is a method of wireless communication for implementing any of aspects 18 to 28.

Aspect 35 is an apparatus for wireless communication including means for implementing any of aspects 18 to 28.

Aspect 36 is a computer-readable medium storing computer executable code, where the code when executed by a processor causes the processor to implement any of aspects 18 to 27.

Aspect 37 is a method of wireless communication for implementing any of aspects 29 to 30.

Aspect 38 is an apparatus for wireless communication including means for implementing any of aspects 29 to 30.

Aspect 39 is a computer-readable medium storing computer executable code, where the code when executed by a processor causes the processor to implement any of aspects 29 to 30.

What is claimed is:

1. An apparatus for wireless communication at a user equipment (UE), comprising:

memory; and at least one processor coupled to the memory and configured to:

receive, via a sidelink interface from a second UE, paging information;

transmit, to a base station, the paging information;

receive, from the base station, a radio resource control (RRC) message comprising a paging record of at least one UE including the second UE; and transmit the paging record to the at least one UE including the second UE via the sidelink interface without decoding a paging message.

2. The apparatus of claim 1, wherein the paging information comprises one or more UE identifiers (IDs) associated with the second UE or one or more paging occasions.

3. The apparatus of claim 2, wherein the one or more UE IDs comprises: a serving temporary mobile subscriber (S-TMSI) ID, an inactive radio network temporary identifier (I-RNTI), or a pseudo UE ID.

4. The apparatus of claim 3, wherein to transmit the paging information to the base station, the at least one processor coupled to the memory is further configured to:

transmit, in sidelink UE information (SUI), the S-TMSI ID or the I-RNTI, and a UE local ID associated with the UE.

5. The apparatus of claim 4, wherein the paging record comprises a paging record of the second UE without a paging record of other UEs.

6. The apparatus of claim 4, wherein to transmit the paging record to the at least one UE including the second UE via the sidelink interface, the at least one processor coupled to the memory is further configured to:

unicast the paging record to the second UE via the sidelink interface.

7. The apparatus of claim 3, wherein to transmit the paging information to the base station, the at least one processor coupled to the memory is further configured to:

transmit, in sidelink UE information (SUI), the pseudo UE ID or the one or more paging occasions for the second UE and a local UE ID associated with the UE.

8. The apparatus of claim 7, wherein the at least one UE comprises at least a third UE.

9. The apparatus of claim 7, wherein to transmit the paging record to the at least one UE including the second UE via the sidelink interface, the at least one processor coupled to the memory is further configured to:

unicast, groupcast or broadcast the paging record to the at least one UE via the sidelink interface.

10. The apparatus of claim 1, wherein the RRC message includes the paging record in mobile terminating (MT) data or one or more paging occasions.

11. The apparatus of claim 1, wherein the at least one processor coupled to the memory is further configured to:

monitor one or more downlink control information (DCI) scrambled with a cell radio network temporary identifier (C-RNTI) in a RRC connected state.

12. The apparatus of claim 1, wherein to transmit the paging record to the at least one UE including the second UE via the sidelink interface, the at least one processor coupled to the memory is further configured to:

add an indication representing paging for the second UE in a medium access control (MAC) header.

13. The apparatus of claim 1, wherein the paging message corresponds to a first paging message for the second UE, and wherein the at least one processor coupled to the memory is further configured to decode a second paging message for the UE.

14. The apparatus of claim 1, further comprising a transceiver coupled to the at least one processor.

15. The apparatus of claim 1, wherein the at least one processor coupled to the memory is further configured to:

establish a UE RRC connection with the base station prior to transmitting the paging information.

16. The apparatus of claim 1, wherein the at least one processor coupled to the memory is further configured to:

monitor for a paging occasion in an active bandwidth part (BWP);

receive, from the base station, a paging for a public warning system (PWS) or a system information block (SIB) update prior to receiving a radio resource control (RRC) message comprising the paging record; and transmit, to the second UE, the paging for the PWS or SIB update via unicasting, broadcasting, or groupcasting over the sidelink interface.

17. The apparatus of claim 1, wherein the RRC message comprises an RRC reconfiguration message or a sidelink UE information (SUI) message.

18. An apparatus for wireless communication at a base station, comprising:

memory; and at least one processor coupled to the memory and configured to:

receive, from a first UE or a second UE, paging information for the second UE; and transmit, to the first UE, a radio resource control (RRC) message comprising a paging record of at least one UE including the second UE, wherein the paging record is configured to be not decoded by the first UE.

19. The apparatus of claim 18, wherein the at least one processor coupled to the memory is further configured to:

establish an RRC connection with the second UE prior to receiving the paging information.

20. The apparatus of claim 18, wherein the at least one processor coupled to the memory is further configured to:

transmit, to the first UE, a paging for a public warning system (PWS) or a system information block (SIB) update for the second UE.

21. The apparatus of claim 18, wherein the paging information comprises one or more UE identifiers (IDs) associated with the second UE or one or more paging occasions.

22. The apparatus of claim 21, wherein the one or more UE IDs comprises: a serving temporary mobile subscriber (S-TMSI) ID, an inactive radio network temporary identifier (I-RNTI), or a pseudo UE ID.

23. The apparatus of claim 22, wherein to receive the paging information from the first UE, the at least one processor coupled to the memory is further configured to:

receive, in sidelink UE information (SUI), the S-TMSI ID or the I-RNTI, and a UE ID associated with the UE.

24. The apparatus of claim 23, wherein the paging record comprises a paging record of the second UE without a paging record of other UEs.

25. The apparatus of claim 22, wherein to receive the paging information from the first UE, the at least one processor coupled to the memory is further configured to:

receive, in sidelink UE information (SUI), the pseudo UE ID or the one or more paging occasions for the second UE and a UE ID associated with the UE.

26. The apparatus of claim 25, wherein the at least one UE comprises at least a third UE.

27. The apparatus of claim 18, wherein the RRC message includes the paging record in mobile terminating (MT) data or one or more paging occasions.

28. The apparatus of claim 18, further comprising a transceiver coupled to the at least one processor.

29. An apparatus for wireless communication at a user equipment (UE), comprising:

memory; and at least one processor coupled to the memory and configured to:

transmit, to a second UE or a base station, paging information for relaying the paging information to the base station, wherein the paging information comprises one or more UE identifiers (IDs) associated with the UE or one or more paging occasions; and receive a paging record via a sidelink interface with the second UE, wherein the paging record is configured to be not decoded by the second UE.

30. The apparatus of claim 29, further comprising a transceiver coupled to the at least one processor.

\* \* \* \* \*